United States Patent
Auger et al.

(10) Patent No.: US 10,016,012 B2
(45) Date of Patent: Jul. 10, 2018

(54) ARTICLE OF FOOTWEAR INCLUDING FULL LENGTH COMPOSITE PLATE

(71) Applicant: NIKE, Inc., Beaverton, OR (US)

(72) Inventors: Perry W. Auger, Tigard, OR (US); Ruzica Krstic, Portland, OR (US); N. Spencer Stone, Portland, OR (US); Edward F. Wachtel, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 535 days.

(21) Appl. No.: 14/330,103

(22) Filed: Jul. 14, 2014

(65) Prior Publication Data

US 2015/0000053 A1    Jan. 1, 2015

Related U.S. Application Data

(60) Continuation of application No. 12/902,630, filed on Oct. 12, 2010, now Pat. No. 8,813,390, which is a
(Continued)

(51) Int. Cl.
*A43B 13/02* (2006.01)
*A43B 13/12* (2006.01)
(Continued)

(52) U.S. Cl.
CPC ............ *A43B 13/026* (2013.01); *A43B 13/12* (2013.01); *A43B 13/122* (2013.01); *A43B 13/14* (2013.01);
(Continued)

(58) Field of Classification Search
CPC ..... A43B 13/026; A43B 13/14; A43B 13/122; A43B 13/12; A43B 13/141; A43D 8/00; B29D 35/142; B29D 35/148
See application file for complete search history.

(56) References Cited

U.S. PATENT DOCUMENTS 2,530,441 A    11/1950  Reinhardt et al.
2,644,250 A     7/1953  Ciaio
(Continued)

FOREIGN PATENT DOCUMENTS

DE    19708113 A1    9/1998
EP     2048981 B1    9/2014

OTHER PUBLICATIONS

Chinese Office Action dated May 18, 2011 for Chinese Application No. CN 200780034387.0 and English translation there of.
(Continued)

*Primary Examiner* — Michael N Orlando
*Assistant Examiner* — Cynthia L Schaller
(74) *Attorney, Agent, or Firm* — Honigman Miller Schwartz and Cohn LLP

(57) ABSTRACT

A full length composite plate to be used as part of an outsole assembly in an article of footwear is disclosed. The full length composite plate comprises a composite material that has a certain percent elongation. The full length composite plate can include a heel cup for heel stability and improved traction. The full length composite plate also can include two angled portions along an arch region that provide arch support, as well as two flattened edges along the arch region to minimize or eliminate buckling. The forefoot region can be relatively flatter than the arch and heel regions, and notches are preferably included along a portion of the forefoot to increase flexibility.

22 Claims, 13 Drawing Sheets

Related U.S. Application Data division of application No. 11/458,044, filed on Jul. 17, 2006, now Pat. No. 7,832,117.

(51) Int. Cl.
  *A43B 13/14* (2006.01)
  *B29D 35/14* (2010.01)
  *A43D 8/00* (2006.01)

(52) U.S. Cl.
  CPC .............. *A43B 13/141* (2013.01); *A43D 8/00* (2013.01); *B29D 35/142* (2013.01); *B29D 35/148* (2013.01)

(56) References Cited

U.S. PATENT DOCUMENTS

| | | |
|---|---|---|
| 2,669,036 A | 2/1954 | Israel |
| 2,808,663 A | 10/1957 | Frieder et al. |
| 3,486,249 A | 12/1969 | Louis et al. |
| 3,492,744 A | 2/1970 | Louis et al. |
| 3,529,370 A | 9/1970 | Louis et al. |
| 3,537,193 A | 11/1970 | Louis et al. |
| 3,559,311 A | 2/1971 | Louis et al. |
| 3,587,181 A | 6/1971 | Louis et al. |
| 3,601,908 A | 8/1971 | Gilkerson |
| 3,624,934 A | 12/1971 | Louis et al. |
| 3,626,611 A | 12/1971 | Louis et al. |
| 3,718,996 A | 3/1973 | Austin |
| 3,760,514 A | 9/1973 | Egtvedt |
| 3,812,605 A | 5/1974 | Kaestle |
| 3,925,529 A | 12/1975 | Bernier et al. |
| 4,023,801 A | 5/1977 | Vanauken |
| 4,368,234 A | 1/1983 | Palmer et al. |
| 4,372,059 A | 2/1983 | Ambrose |
| 4,439,934 A | 4/1984 | Brown |
| 4,510,700 A | 4/1985 | Brown |
| 4,543,222 A | 9/1985 | Ehrlich |
| 4,610,101 A | 9/1986 | Brown |
| 4,611,413 A | 9/1986 | Brown |
| 4,612,713 A | 9/1986 | Brown |
| 4,628,621 A | 12/1986 | Brown |
| 4,651,445 A | 3/1987 | Hannibal |
| 4,654,984 A | 4/1987 | Brown |
| 4,688,338 A | 8/1987 | Brown |
| 4,747,220 A | 5/1988 | Autry et al. |
| 4,757,620 A | 7/1988 | Tiitola |
| 4,778,717 A | 10/1988 | Fitchmun |
| 4,783,910 A | 11/1988 | Boys, II et al. |
| 4,787,156 A | 11/1988 | Bade |
| 4,823,420 A | 4/1989 | Bartneck |
| 4,906,502 A | 3/1990 | Rudy |
| RE33,648 E | 7/1991 | Brown |
| 5,052,130 A | 10/1991 | Barry et al. |
| 5,185,943 A * | 2/1993 | Tong .................... A43B 13/184 36/27 |
| 5,236,776 A | 8/1993 | Fitchmun et al. |
| 5,240,773 A | 8/1993 | Dunn |
| 5,338,600 A | 8/1994 | Fitchmun et al. |
| 5,354,604 A | 10/1994 | Blakeman et al. |
| 5,390,430 A | 2/1995 | Fitchmun et al. |
| 5,406,723 A | 4/1995 | Okajima |
| 5,426,873 A | 6/1995 | Savoie |
| 5,473,827 A | 12/1995 | Barre et al. |
| 5,525,412 A | 6/1996 | Blakeman et al. |
| 5,529,826 A | 6/1996 | Tailor et al. |
| 5,571,607 A | 11/1996 | Blakeman et al. |
| 5,624,386 A | 4/1997 | Tailor et al. |
| 5,667,857 A | 9/1997 | Watanabe et al. |
| 5,692,935 A | 12/1997 | Smith |
| 5,733,647 A | 3/1998 | Moore, III et al. |
| 5,766,724 A | 6/1998 | Tailor et al. |
| 5,772,945 A | 6/1998 | Brown |
| 5,785,909 A | 7/1998 | Chang et al. |
| 5,832,634 A | 11/1998 | Wong |
| 5,918,338 A | 7/1999 | Wong |
| 5,932,336 A | 8/1999 | Allen et al. |
| 5,960,566 A | 10/1999 | Brown |
| 5,979,081 A | 11/1999 | Vaz |
| 5,992,056 A | 11/1999 | Lohrmann |
| 6,145,221 A | 11/2000 | Hockerson |
| 6,425,193 B2 | 7/2002 | Vaz |
| 6,461,673 B1 | 10/2002 | Vaz |
| 6,474,003 B2 | 11/2002 | Erickson et al. |
| 6,485,661 B1 | 11/2002 | Brown |
| 6,505,421 B1 | 1/2003 | Vaz |
| 6,510,626 B1 | 1/2003 | Greenawalt |
| 6,523,282 B1 | 2/2003 | Johnston |
| 6,536,137 B1 | 3/2003 | Celia |
| 6,684,532 B2 | 2/2004 | Greene et al. |
| 6,775,930 B2 | 8/2004 | Fuerst |
| 6,782,642 B2 * | 8/2004 | Knoche ................ A43B 1/0009 36/129 |
| 6,826,852 B2 | 12/2004 | Fusco |
| 6,910,287 B2 | 6/2005 | Truelsen |
| 6,935,055 B2 | 8/2005 | Oorei |
| 6,944,972 B2 | 9/2005 | Schmid |
| 7,401,421 B2 | 7/2008 | Brennan et al. |
| 7,487,604 B2 | 2/2009 | Perron et al. |
| 7,526,880 B2 | 5/2009 | Polcek et al. |
| 7,832,117 B2 | 11/2010 | Auger et al. |
| 7,886,461 B2 | 2/2011 | Sato |
| 7,921,580 B2 | 4/2011 | Russell |
| 7,954,259 B2 | 6/2011 | Antonelli et al. |
| 8,051,586 B2 | 11/2011 | Auger et al. |
| 8,209,883 B2 | 7/2012 | Lyden et al. |
| 8,241,451 B2 | 8/2012 | Rapaport et al. |
| 8,813,390 B2 | 8/2014 | Auger et al. |
| 2002/0011011 A1 | 1/2002 | Vaz |
| 2002/0066209 A1 | 6/2002 | Steed et al. |
| 2004/0088888 A1 | 5/2004 | Johnston |
| 2004/0107601 A1 | 6/2004 | Schmid |
| 2004/0148806 A1 | 8/2004 | Sussmann |
| 2004/0226191 A1 | 11/2004 | Hsieh |
| 2005/0034328 A1 * | 2/2005 | Geer .................... A43B 3/0036 36/30 R |
| 2005/0166427 A1 | 8/2005 | Greene et al. |
| 2006/0021257 A1 | 2/2006 | Hung |
| 2008/0010863 A1 | 1/2008 | Auger et al. |
| 2010/0083534 A1 | 4/2010 | Howlett |
| 2011/0023327 A1 | 2/2011 | Auger et al. |
| 2012/0180337 A1 | 7/2012 | McLinden |

OTHER PUBLICATIONS

Chinese Office Action dated Aug. 2, 2012 for Chinese Application No. CN 200780034387.0 and English translation thereof.
Chinese Office Action dated Jul. 5, 2010 for Chinese Application No. CN 200780034387 and English translation thereof.
Chinese Office Action dated Mar. 5, 2013 for Chinese Application No. CN 200780034387.0.
Chinese Office Action dated Jan. 10, 2011 for Chinese Application No. CN 200780034387.0 and English translation thereof.
International Search Report and Written Opinion for Application No. PCT/US07/73586, dated Jan. 28, 2008.
Notice of Intention to Grant dated Apr. 2, 2014 for European Application No. 07799615.5.
Rejection Decision by the State Intellectual Property Office dated Oct. 26, 2011 for Chinese Application No. CN 200780034387.0 and English translation thereof.
Request for Reexamination to Rejection Decision for Chinese Application No. CN200780034387.0 filed Jan. 29, 2013 and English translation of the claim set.
Response to Chinese Office Action for Chinese Application No. CN 200780034387.0 filed Aug. 2, 2011.
Response to Chinese Office Action for Chinese Application No. CN 200780034387.0 filed Oct. 17, 2012 and English translation of Observation and claims.
Response to Chinese Office Action for Chinese Application No. CN 200780034387.0 filed May 20, 2013.
Response to Chinese Office Action for Chinese Application No. CN 200780034387.0 filed Mar. 25, 2011 and English translation thereof.

(56) References Cited

OTHER PUBLICATIONS

Reexamination Decision dated Feb. 27, 2012 withdrawing Rejection Decision in Chinese Application No. CN 200780034387.0.

* cited by examiner

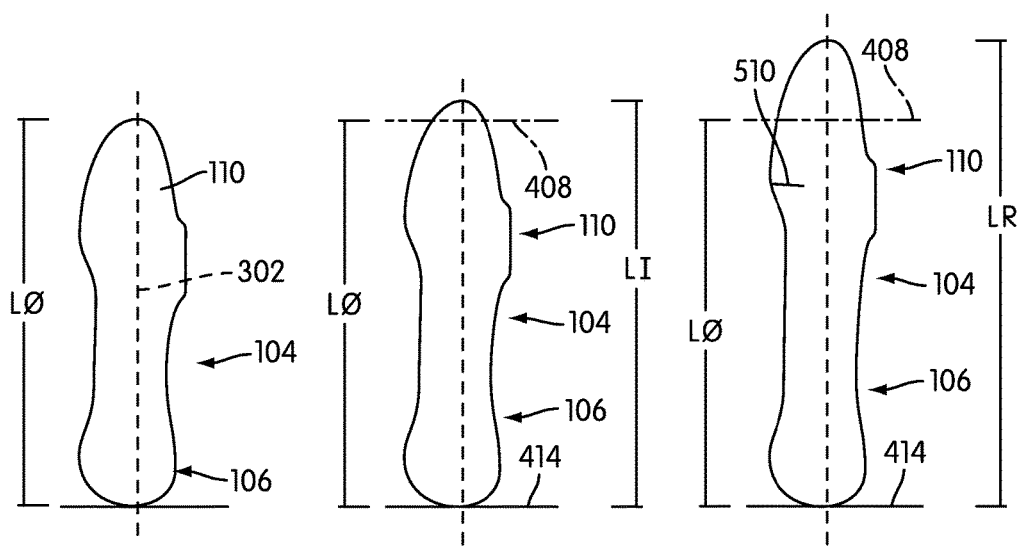

ARTICLE OF FOOTWEAR INCLUDING FULL LENGTH COMPOSITE PLATE

This application is a continuation of U.S. Patent Publication Number US 2011/0023327 A1, published Feb. 3, 2011 (U.S. patent application Ser. No. 12/902,630, filed Oct. 12, 2010), which is a division of U.S. Pat. No. 7,832,117, issued Nov. 16, 2010 (U.S. patent application Ser. No. 11/458,044, filed Jul. 17, 2006), both of which are herein incorporated by reference in their entirety.

BACKGROUND

1. Field

The present invention relates generally to footwear, and in particular the present invention relates to a composite plate in footwear outsoles.

2. Description of Related Art

Modern footwear generally requires two competing and often contradictory demands: specific stiffness and reduced weight. Specific stiffness refers to stiffness per unit weight. Generally, increasing specific stiffness and durability requires additional material and, subsequently, additional weight. Reducing weight generally requires reducing material and in turn, sacrificing strength. To meet the need for increasing strength and durability, while at the same time, reducing weight, designers have proposed the use of composite materials, usually in the form of a composite plate.

While composite materials provide increased strength without increased weight, their use in articles of footwear has been difficult to implement and limited. The composite plate is usually only found in one portion of the footwear, usually either in the heel or the forefoot. Though partial composite plates provide the necessary structure in the desired region of the footwear while allowing the footwear to remain lightweight, full length composite plates have not been previously used as part of any type of athletic footwear. This is due to the particular structure of some composite materials, which often rupture or buckle under the stresses encountered during normal use. In particular, previous composite plates have been too rigid and inflexible, and could not be used where flexibility was required.

Vas (U.S. Pat. No. 6,425,193) discloses a full length composite plate that is composed of a metal matrix containing graphite and ceramic which is impregnated with a metal alloy. This sort of composite plate does not meet the requirement of being lightweight, as is most desirable in many types of footwear, including those used by athletes.

In general, there is a need for a lightweight full length composite plate that could be used as the primary structural component of various types of footwear. The desired full length composite plate would allow for maximum support in the heel and arch and provide proper structure and flexibility in the forefoot region, while at the same time, helping to maintain the desired weight reduction.

SUMMARY

An article of footwear including a full length composite plate is disclosed. In one aspect, the invention provides an article of footwear comprising: an upper and an outsole assembly; the outsole assembly including a full length composite plate; and where the full length composite plate has a percent elongation greater than 2 percent.

In another aspect, the percent elongation is greater than 3 percent.

In another aspect, the full length composite plate comprises a first material and a second material.

In another aspect, the first material is lightweight and flexible and the second material is more rigid than the first material.

In another aspect, the full length composite plate includes a first layer comprised of the first material and is attached to the second layer comprised of the second material.

In another aspect, the second layer is comprised of the second material and is attached to a first layer one side and a third layer on a second side.

In another aspect, the third layer is comprised of the first material and is attached to the second layer and a fourth layer, wherein the fourth layer is comprised of the second material.

In another aspect, the fourth layer is comprised of the second material and is attached to the third layer and a fifth layer.

In another aspect, the fifth layer is comprised of the first material and is attached to the fourth layer and a sixth layer.

In another aspect, the sixth layer is comprised of the second material and is attached to the fifth layer and a seventh layer.

In another aspect, the seventh layer is comprised of the first material.

In another aspect, the first material is TPU.

In another aspect, the second material is a woven carbon fiber.

In another aspect, the first layer is disposed adjacent to a first tie layer.

In another aspect, the seventh layer is disposed adjacent to a second tie layer.

In another aspect, the first and second tie layers have a thickness of 100 microns.

In another aspect, the invention provides an article of footwear comprising: an upper and an outsole assembly; the outsole assembly including a full length composite plate; the full length composite plate comprising a first portion and a second portion; and where the first portion is more flexible than the second portion.

In another aspect, the first portion is associated with the forefoot.

In another aspect, the first portion is a forefoot region.

In another aspect, the first portion is an arch region.

In another aspect, the first portion is a heel region.

In another aspect, the invention provides an article of footwear comprising: an upper and an outsole assembly; the outsole assembly including a full length composite plate; the composite plate having an arch region associated with the arch of a foot; the arch region including a lateral portion, a medial portion, and a central portion disposed between the lateral portion and the medial portion; and where the arch region includes at least one angled portion.

In another aspect, the at least one angled portion is disposed along the central portion.

In another aspect, the at least one angled portion is disposed along the lateral portion.

In another aspect, the at least one angled portion is disposed along the medial portion.

In another aspect, the invention provides an article of footwear comprising: an upper and an outsole assembly; the outsole assembly including a full length composite plate; the composite plate including a heel region associated with the heel of the foot; the heel region including an outer periphery and a central portion; the outer periphery including a medial portion, a lateral portion, and a rear portion; and where a portion of the outer periphery is angled with respect to the central portion.

In another aspect, the angled portion of the outer periphery is disposed on the lateral portion.

In another aspect, the angled portion of the outer periphery is disposed on the medial portion.

In another aspect, the angled portion of the outer periphery is disposed along the rear portion.

In another aspect, the invention provides an article of footwear comprising: an upper and an outsole assembly; the outsole assembly including a full length composite plate; the full length composite plate including an outer material; the outsole assembly also including tread elements; and where the tread elements are secured directly to the outer material of the full length composite plate.

In another aspect, the outer material and the tread elements comprise the same material.

In another aspect, the outer material and the tread elements comprise different materials.

In another aspect, the invention provides a method of making an article of footwear comprising the steps of: associating a full length composite plate with a first side of a molding base, a first surface of the full length composite plate confronting the first side of the molding base, the full length composite plate also including a second surface disposed opposite the first surface; associating a first side of an upper mold with the first side of the molding base, enclosing the full length composite plate within a central cavity disposed within the upper mold; filling the central cavity with a liquid or viscous substance through at least one injection channel in the upper mold; and where the liquid or viscous substance fills substantially the entirety of the central cavity and contacts the second side of the full length composite plate.

In another aspect, the central cavity contains at least one secondary cavity disposed along, and in fluid communication with, an outer periphery of the central cavity.

In another aspect, the secondary cavity is shaped for molding a traction element.

In another aspect, the upper mold is compressed against the molding base under enough pressure to keep the liquid or viscous substance confined to a region bounded by the central cavity and a portion of the molding base exposed to the central cavity.

In another aspect, a central cavity rim disposed along the first side of the upper mold has a perimeter larger than a perimeter of the first surface of the full length composite plate.

In another aspect, the central cavity includes more than one injection channel.

In another aspect, the invention provides an article of footwear comprising: an outsole assembly; the outsole assembly including a full length composite plate; and where the full length composite plate has a flex angle between 5 and 70 degrees.

In another aspect, the full length composite plate has a flex angle between 15-30 degrees.

In another aspect, the full length composite plate has a flex angle between 37-42 degrees.

In another aspect, the full length composite plate has a flex angle greater than 15 degrees.

In another aspect, the full length composite plate has a flex angle greater than 15 degrees.

In another aspect, the full length composite plate has a flex angle greater than 30 degrees.

In another aspect, the full length composite plate has a flex angle greater than 45 degrees.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 3 is a plan view of a preferred embodiment of full length composite plate;

FIG. 4 is a plan view of a preferred embodiment of a full length composite plate stretched under tension;

FIG. 5 is an isometric view of a preferred embodiment of a full length composite plate stretched under tension;

DETAILED DESCRIPTION

A full length composite plate is disclosed here. The term "full length composite plate" as used throughout the entirety of this specification, including the claims, is defined as any composite plate which can provide support to portions of the forefoot, portions of the arch, and portions of the heel of the foot simultaneously.

Figure 1:
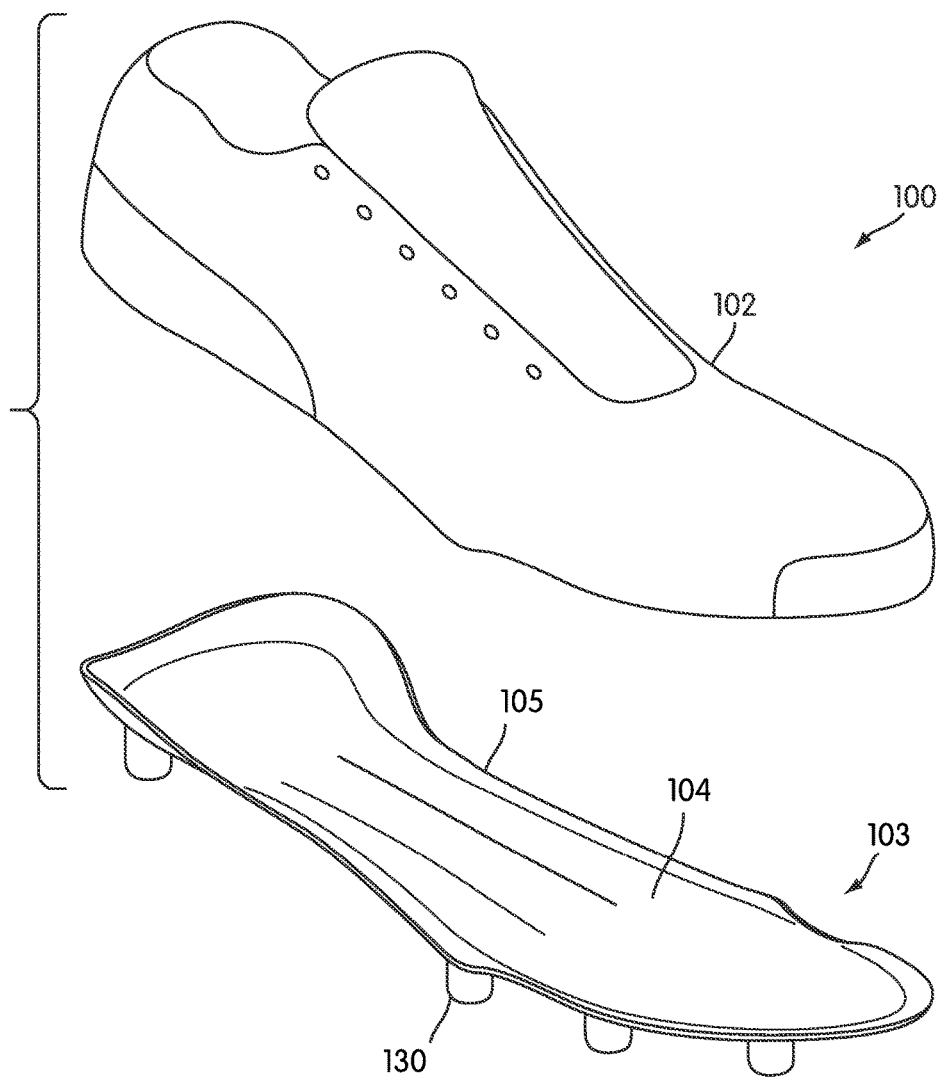
FIG. 1 is an exploded view of a preferred embodiment of an article of footwear.

FIG. 1 shows an exploded view of a preferred embodiment of an article of footwear 100. Article of footwear 100 includes an upper 102. Upper 102 could be made of any material, preferably a lightweight fiber. In some embodiments, upper 102 is composed of many different materials. Article of footwear 100 includes outsole assembly 103. Outsole assembly 103 includes full length composite plate 104. Article of footwear 100 may be a running shoe, a soccer shoe, a cross training shoe, a basketball shoe or any other article of footwear. Although in this embodiment there is no midsole, some embodiments may include a midsole.

In some embodiments, outsole assembly 103 may include a tread element 130. Outsole assembly 103 may also include other kinds of tread elements. In some embodiments, these tread elements may be directly attached to full length composite plate 104. Full length composite plate 104 includes an outer material 105. In some embodiments, tread element 130 may be secured directly to outer material 105. Outer material 105 may comprise the same material as tread element 130, or outer material 105 may be composed of a different material. Similarly, multiple tread elements may be secured directly to outer material 105. The multiple tread elements may comprise the same or different materials than outer material 105.

Figure 2:
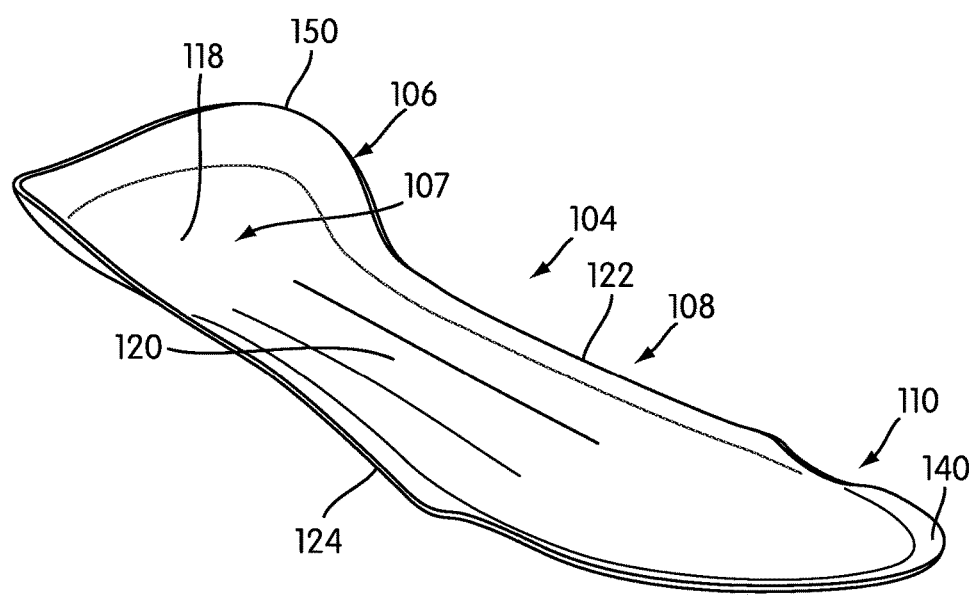
FIG. 2 is an isometric view of a preferred embodiment of a full length composite plate.

FIG. 2 is an isometric view of a preferred embodiment of full length composite plate 104. Full length composite plate 104 includes heel region 106, arch region 108 and forefoot region 110. Arch region 108 is disposed between heel region 106 and forefoot region 110. Heel region 106 includes heel cup 107. Heel cup 107 includes heel outer periphery 150 and central portion 118. Arch region 108 includes central portion 120. Arch region 108 also includes medial portion 122 and lateral portion 124. In some embodiments, forefoot region 110 may include raised forward rim 140.

Full length composite plate 104, shown in FIG. 2, is intended for an article of footwear designed for a wearer's right foot. Generally another full length composite plate that is the mirror image of composite plate 104 would be manufactured for an article of footwear designed for a wearer's left foot.

In the past, composite plates have generally been found only in a portion of an article of footwear. The composite plate may be placed in the region of the midsole that engages the heel, or it may be placed in the region of the article of footwear that engages the ball of the foot and toes. Under most circumstances, previous composite plates were unable to support the entire length of the foot simultaneously. This is because previous full length composite plates buckled or ruptured under normal stresses applied to an article of footwear during use. In other words, previous composite materials were too stiff and inflexible, and could only be used in small, localized areas.

However, it is possible to select a composite plate material from which a full length composite plate may be manufactured and used as a support structure for the forefoot, arch, and heel regions of the foot. A primary characteristic of the composite plate material is its percent elongation. Percent elongation is a standard measure of the ductility of a material. It represents the amount a material can be stretched along its primary axis before rupturing. Percent elongation is given by the following equation:

Percent Elongation=$100(LR-L0)/L0$

Here, LR represents the length of the material at the moment it has ruptured, while L0 represents the initial length of the material. These measurements are preferably taken with respect a central axis.

In a preferred embodiment, the percent elongation of a composite material to be used for a full length composite plate is 2 percent. In some embodiments, the percent elongation for a full length composite plate may be greater than 2 percent. In other embodiments, the percent elongation can be 3 percent or more.

FIG. 3 shows a plan view of a preferred embodiment of full length composite plate 104 as viewed from above. In this embodiment, full length composite plate 104 is at rest (unstressed) and has a length L0, as measured along central axis 302 that runs from the tip of heel region 106 to the tip of forefoot region 110.

FIG. 4 is a plan view of a preferred embodiment of full length composite plate 104 under tension along central axis 302. This tension may be accomplished by fixing the tip of heel region 106 to base 414 and pulling the opposite end with some tensioning device. Dotted line 408 represents the initial of position of tip forefoot region 110. The distance from dotted line 408 to base 414 is L0, the original length of full length composite plate 104. Now under tension, full length composite plate 104 has been elongated to a new intermediate length, LI. Here, full length composite plate 104 has been elongated by an amount (LI−L0). In this position, full length composite plate 104 has been deformed, but has not ruptured or failed.

FIG. 5 is a plan view of a preferred embodiment of full length composite plate 104 under tension along central axis 302. Here, the stress applied to full length composite plate 104 has elongated it so that the distance between the tip of forefoot region 110 and base 414 is LR. At this length, full length composite plate 104 ruptures, as indicated schematically by small crack 510. In the embodiment shown in FIG. 5, full length composite plate 104 has been stretched by an amount (LR−L0); and small crack 510 is the first sign of rupturing. In other embodiments, full length composite plate 104 can fail by de-laminating, splitting, or by some other failure mode.

Figure 6:
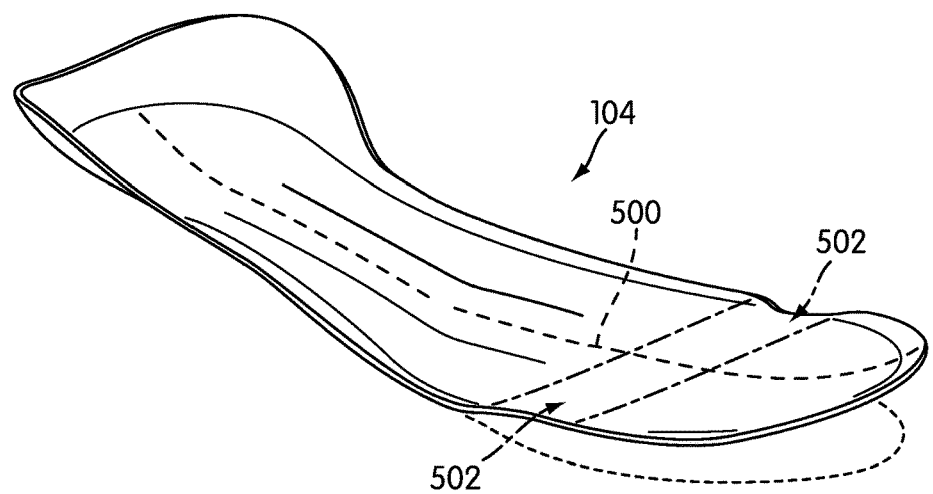
FIG. 6 is an isometric view of a preferred embodiment of full length composite plate bending.

It is unlikely that a full length composite plate serving as a portion of an article of footwear will experience direct tension along its primary axis. Instead, it is much more likely that the full length composite plate will bend in various ways. Preferably, a full length composite plate is constructed from materials that allow it to bend by a predetermined amount without rupturing. Referring to FIG. 6, a preferred embodiment of full length composite plate 104 may experience bending. As various stresses are applied to full length composite plate 104 by the foot and surface during the use of an article of footwear, bending may occur. Bending could occur anywhere within composite plate 104. In the example shown in FIG. 6, bending occurs at bending region 502. In particular, bending occurs with respect central axis 500. However, any other regions of full length composite plate 104 could be bent in similar ways due to the usual stresses applied to portions of the full length composite plate during the use of article of footwear 100.

Figure 7:
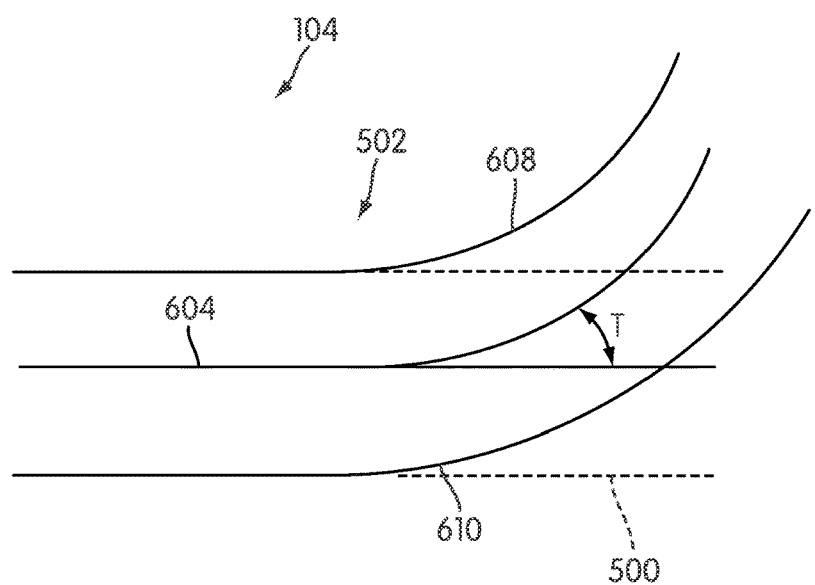
FIG. 7 is an enlarged view of a preferred embodiment of the region of full length composite bending.

FIG. 7 is an enlarged view of a preferred embodiment of bending region 502. In the embodiment shown in FIG. 7, inner side 608 of full length composite plate 104 is disposed closest to the foot during motion, and outer side 610 of full length composite plate 104 is disposed closest to the surface during motion. Typical motions that occur during the use of an article of footwear will result in bending of full length composite plate 104 in local regions, such as bending region 502.

In this embodiment, a portion of full length composite plate 104 has been bent away or flexed from its original position 500 by a flex angle T. During bending, compressive loads are applied to inner surface 608, while tensile loads are applied to outer surface 610. Neutral surface 604 is the surface through which there is no net force. Between neutral surface 604 and inner surface 608 compressive loads are increased along surfaces parallel to neutral surface 604, reaching a maximum at inner surface 608. Likewise between neutral surface 604 and outer surface 610 tensile loads are increased along surfaces parallel to neutral surface 604, reaching a maximum at outer surface 610. The area between neutral surface 604 and outer surface 610 is experiencing tensile loads and therefore will undergo some local elongation.

In general, the flex angle T of a composite plate is related to the strain ε applied to the composite plate. In some mathematical models, the strain ε is linearly related to the flex angle T of a composite plate. As the flex angle T of the composite material changes, so will the strain ε. Generally, the higher the flex angle T, the higher the strain ε.

To actually relate flex angle T to strain ε, the thickness of the material and the flex zone length are needed. In one example, the thickness is about 1 mm and the flex zone length is about 20 mm. In this example, to accommodate a flex angle T of 60 degrees, the necessary strain is ε=2.9%. In a second example, where the thickness is about 2 mm, a flex angle T of 60 degrees causes a strain of about 5.8%. The flex zone length is selected to accurately model the actual behavior of the human foot, and the natural bending motion the human foot is likely to impose on an article of footwear being worn.

Because strain is a measure of the change in length of a material, the relationship between strain and percent elongation is straightforward. Percent elongation is simply the amount of strain applied at the rupturing length of a material. Therefore, in order to accommodate a given flex angle T, the percent of elongation of a material should be greater than the strain caused by flex angle T.

During typical use of an article of footwear, bending will occur. Because bending involves local elongation of a material, materials comprising the article of footwear may rupture if they are stretched beyond their characteristic rupturing length. As part of an article of footwear, a full length composite plate may be designed to endure a predetermined amount of bending in local regions. The materials comprising the full length composite plate may be chosen from a set of candidate materials based on the predetermined amount of bending that the full length composite plate is expected to experience during use. In particular, acceptable candidate materials for full length composite plates can be selected based on percent elongation criteria, as disclosed above. Also, acceptable materials for use as full length composite plates can be selected based on flex angle T.

Bending region 502 is used here only as an example of a region where full length composite plate 104 may undergo stresses that cause it to bend. Full length composite plate 104 may experience stresses that cause bending at many different regions. In all these regions, though bending may cause elongation in some portions, full length composite plate 104 is generally designed to withstand a certain percentage of elongation as previously discussed.

As previously discussed, an important characteristic to be considered in designing a full length composite plate is the flex angle. Depending on the use of the article of footwear, full length composite plates may be designed to accommodate different flex angles.

Generally, a full length composite plate should be able to accommodate flex angles between 5 and 70 degrees, depending on the application. Any article of footwear that needs to accommodate flex angles between 5 and 70 degrees may be designed using the characteristics of a full length composite plate disclosed in this specification. In a preferred embodiment, a full length composite plate may be configured to accommodate flex angles between 15-30 degrees. These are typical flex angles for a running shoe or a track shoe. In other embodiments, a full length composite plate may be configured to accommodate flex angles between 37-42 degrees. An example of a type of shoe that requires this range of flex angles is a soccer cleat.

In some embodiments, full length composite plate 104 comprises two distinct materials. In some embodiments, full length composite plate 104 comprises a layered structure. In those embodiments where full length composite plate includes at least two materials, full length composite plate 104 preferably includes a first distinct material that is lightweight and flexible, and a second distinct material that is more rigid than the first. In a preferred embodiment, the first material is thermoplastic urethane (TPU). In a preferred embodiment, the second material is a woven sheet of carbon fibers.

Figure 8:
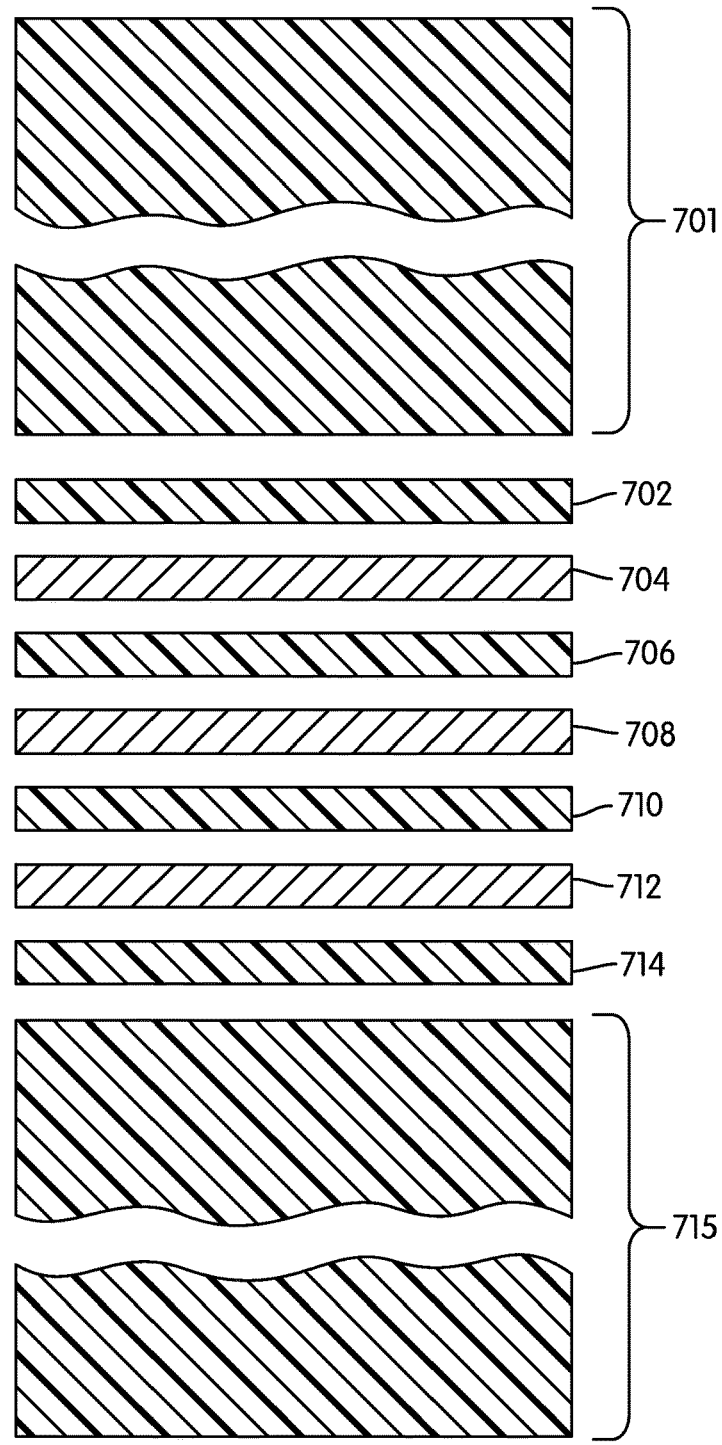
FIGS. 8 and 9 are cross sectional views of preferred embodiments of the composite materials that are layered to form a full length composite plate.

FIG. 8 is a cross sectional side view of a preferred embodiment of the layering of the two distinct materials that comprise the full length composite plate. Preferably, the two distinct materials alternate in layers. First fiber layer 704 is disposed between first TPU layer 702 and second TPU layer 706. Second fiber layer 708 is disposed between second TPU layer 706 and third TPU layer 710. Third fiber layer 712 is disposed between third TPU layer 710 and fourth TPU layer 714.

In a preferred embodiment (shown in FIG. 8), a first tie layer 701 may be disposed adjacent to first TPU layer 702. In a similar manner, a second tie layer 715 may be disposed adjacent to fourth TPU layer 714. First tie layer 701 and second tie layer 715 may be constructed of TPU as well. First tie layer 701 and second tie layer 714 are preferably much thicker than first TPU layer 702, second TPU layer 706, third TPU layer 710, and fourth TPU layer 714.

In some embodiments, the thickness of the TPU layers 702, 706, 710 and 714 may be varied. In some embodiments, the thicknesses may range between 5 and 15 microns. In a preferred embodiment, first TPU layer 702, second TPU layer 706, third TPU layer 710, and fourth TPU layer 714 are about seven microns thick.

In this embodiment, the thicknesses of the tie layers 701 and 715 may be varied. Generally, the thicknesses may range from 10 to 500 microns. In some embodiments, the thicknesses may range from 50 to 200 microns. In some embodiments, the thicknesses may range from 90 to 110 microns. In a preferred embodiment, the thickness of the tie layers 701 and 715 are about 100 microns. One hundred microns is an optimized thickness at which the strength to weight ratio of a TPU layer in this environment is maximized.

Additionally, in a preferred embodiment, first tie layer 701 and second tie layer 715 have a lower melting point than the other TPU layers 702, 706, 710, 714. First tie layer 701 and second tie layer 715 may be bonded to a molding material, such as TPU.

In an alternative embodiment, the tie layers may be associated directly with the fiber layers. In other words, first TPU layer 702 and fourth TPU layer 714 from the previous embodiment may be removed. Instead, the tie layers may be disposed adjacent to fiber layers. By attaching the tie layers directly to the fiber layers, the structural properties of the full length composite plate may be modified.

Figure 9:
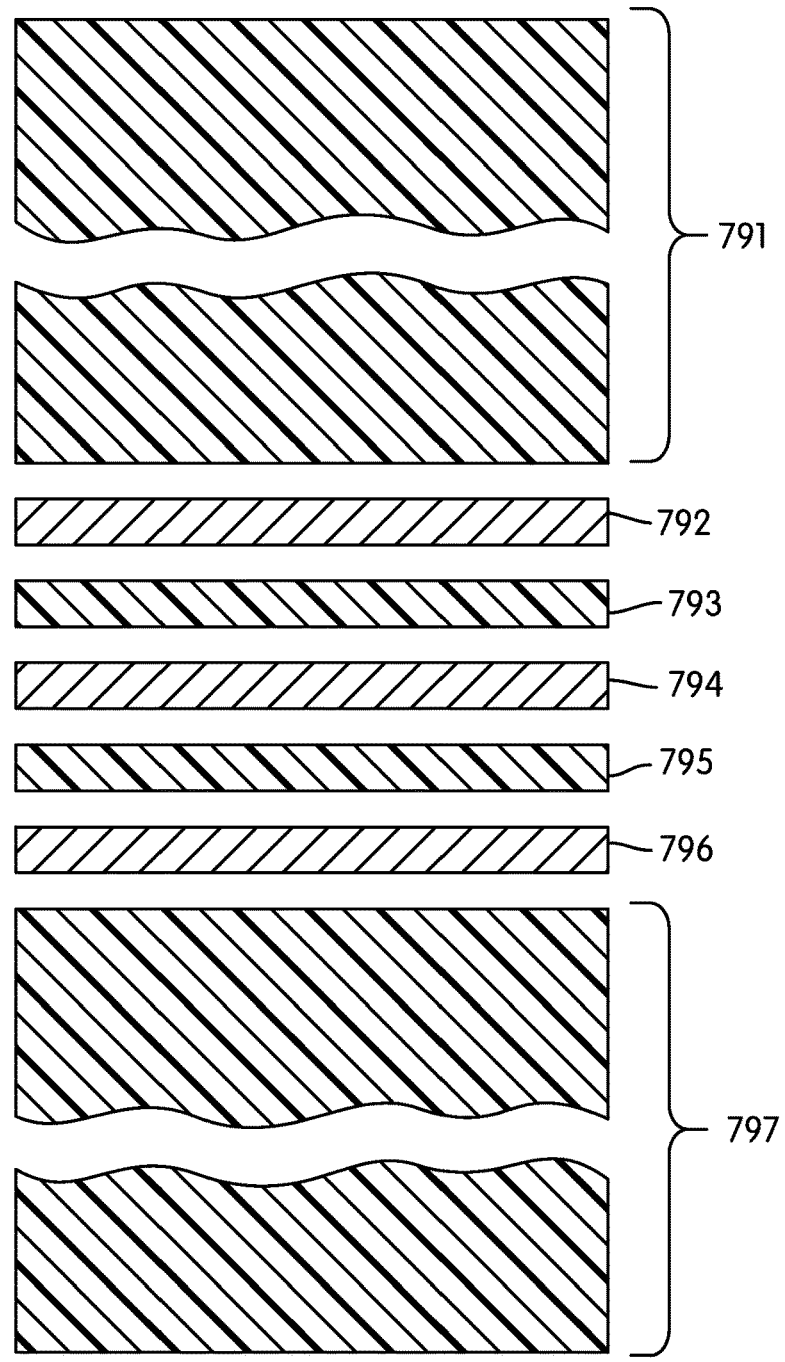

Referring to FIG. 9, a full length composite plate may comprise seven layers. First fiber layer 792, second TPU layer 793, second fiber layer 794, third TPU layer 795, and third fiber layer 796 are disposed in the same manner described for the previous embodiment. However, in this embodiment, first fiber layer 792 is preferably disposed adjacent to first tie layer 791. Likewise, third fiber layer 796 is preferably disposed adjacent to second tie layer 797.

As with the previous embodiment, the thicknesses of the tie layers 791 and 797 may be varied. Generally, the thicknesses may range from 10 to 500 microns. In some embodiments, the thicknesses may range from 50 to 200 microns. In some embodiments, the thicknesses may range from 90 to 110 microns. In a preferred embodiment, the thickness of the tie layers 791 and 797 are about 100 microns.

Modifying the thicknesses of the tie layers in each embodiment may change the bonding properties between the tie layers and the fiber layers. Additionally, modifying the thicknesses of the tie layers may vary the structural properties of the full length composite plate. In some embodiments, the flex angle may be varied. In some embodiments, the percent elongation may be varied.

In general, each fiber layer 704, 708 and 712 may be oriented differently. Preferably, the weave geometry comprising each fiber layer 704, 708 and 712 may be disposed at angles with respect to one another. By changing the relative orientation of the respective weave geometries, the structural properties of the full length composite plate may be modified.

Figure 10:
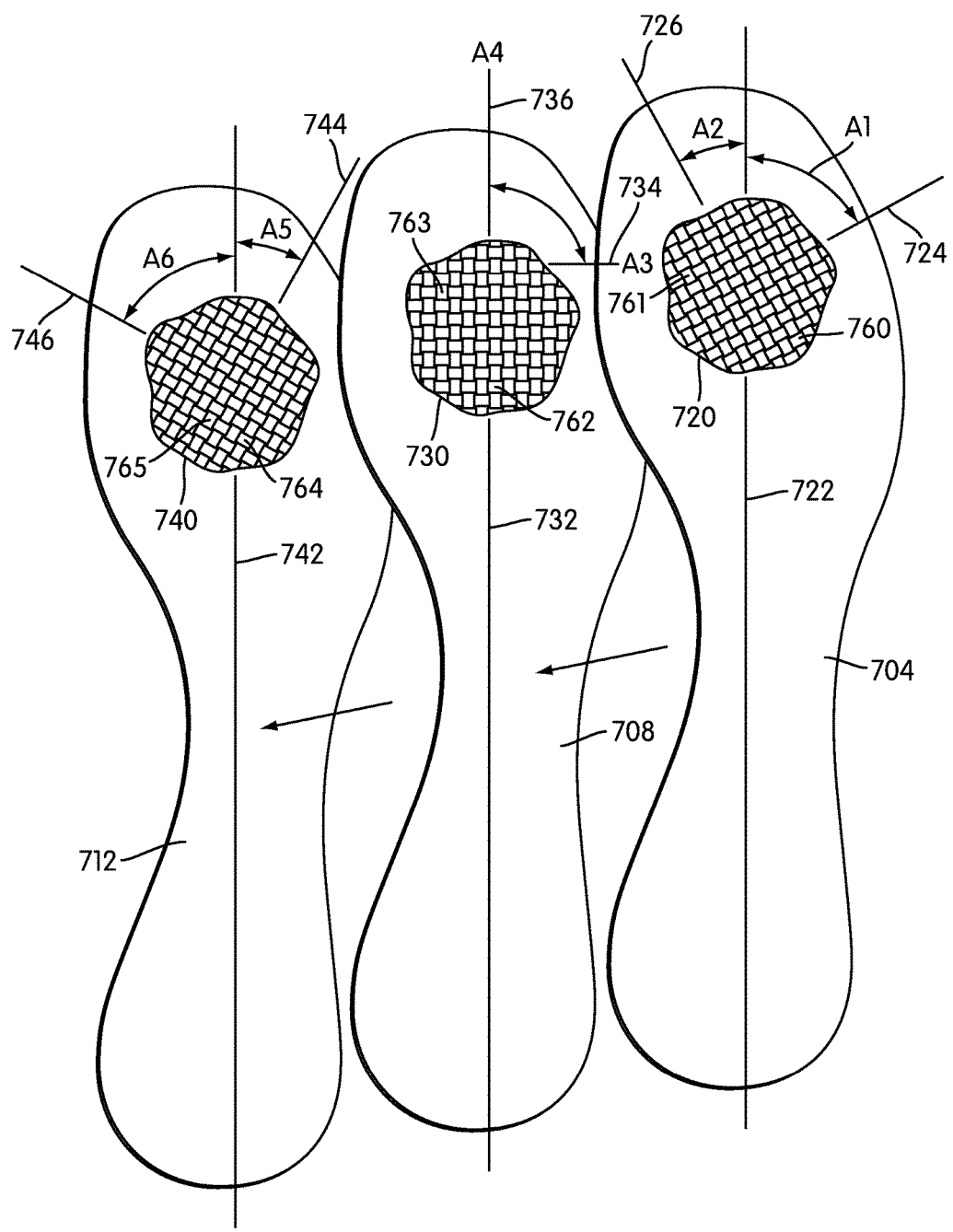
FIG. 10 is an exploded oblique view of a preferred embodiment of the layering structure of a composite materials in a full length composite plate.

Referring to FIG. 10, an illustrative embodiment of the orientation of first fiber layer 704, second fiber layer 708, and third fiber layer 712 is shown. Seen here as an exploded oblique view, each of the individual fiber layers 704, 708, 712 are preferably disposed so that the weaving patterns are oriented in different directions. In the following description, the term weft refers to the fibers in a weave oriented in a horizontal, or left to right direction. The term warp refers to the fibers in a weave oriented in a vertical or top to bottom direction. Generally, the weft and warp are always set at right angles to one another.

In the embodiment shown in FIG. 10, first fiber layer 704 includes first longitudinal axis 722, oriented along the length of the article of footwear. For clarity, a first portion 720 of the weaving pattern of first fiber layer 704 is shown. In a preferred embodiment, the weaving pattern comprises the entirety of first fiber layer 704. In a preferred embodiment, first weft 760 is set at a first angle A1 from first longitudinal axis 722. Likewise, first warp 761 is preferably set at a second angle A2 from first longitudinal axis 722.

In a preferred embodiment, second fiber layer 708 includes second longitudinal axis 732, oriented along the length of the article of footwear. As with first fiber layer 704, only a second portion 730 of the weaving pattern of second fiber layer 708 is shown. In a preferred embodiment, the weaving pattern comprises the entirety of second fiber layer 708. In a preferred embodiment, second weft 762 is set at a third angle A3 with respect to second longitudinal axis 732. Likewise, second warp 763 is preferably set at a fourth angle A4 from second longitudinal axis 732.

In a manner similar to first fiber layer 704 and second fiber layer 708, third fiber layer 712 preferably includes third longitudinal axis 742, oriented along the length of the article of footwear. As with the other fiber layers 704, 708, only a third portion 740 of the weaving pattern of third fiber layer 712 is shown. In a preferred embodiment, the weaving pattern comprises the entirety of third fiber layer 712. In a preferred embodiment, third weft 764 is set at a fifth angle A5 from third longitudinal axis 742. Likewise, third warp 765 is preferably set at a sixth angle A6 from third longitudinal axis 742.

In general, each angle A1, A2, A3, A4, A5, and A6 may be any angle. In some embodiments, the weft and warp angles will be identical for each of the fiber layers 704, 708, and 712. In a preferred embodiment, third angle A3 and fourth angle A4 are 90 and 0 degrees respectively. Also, second angle A2 and fifth angle A5 are preferably less than 45 degrees from their respective axes, while first angle A1 and sixth angle A6 are preferably between 45 and 90 degrees.

The characteristics of a full length composite plate may be modified by changing the orientation of each fiber layer with respect to one another. That is, by changing the angles A1, A2, A3, A4, A5, and A6. In some cases, the percent elongation of the full length composite plate may be modified by changing angles A1, A2, A3, A4, A5, and A6. In some cases, the flex angle of the full length composite plate may be modified by changing angles A1, A2, A3, A4, A5, and A6.

In one embodiment, to increase the flexibility of the full length composite plate, the weave orientation of each fiber layer 704, 708, and 712 may be similar and may be set at 45 degrees angles to a longitudinal axis. That is: A1 is +45 degrees, A2 is −45 degrees, A3 is +45 degrees, A4 is −45 degrees, A5 is +45 degrees and A6 is −45 degrees. This arrangement helps to improve flexibility.

Any suitable material could be used as the fiber layer. In an exemplary embodiment, a carbon fiber layer is used.

Figure 11:
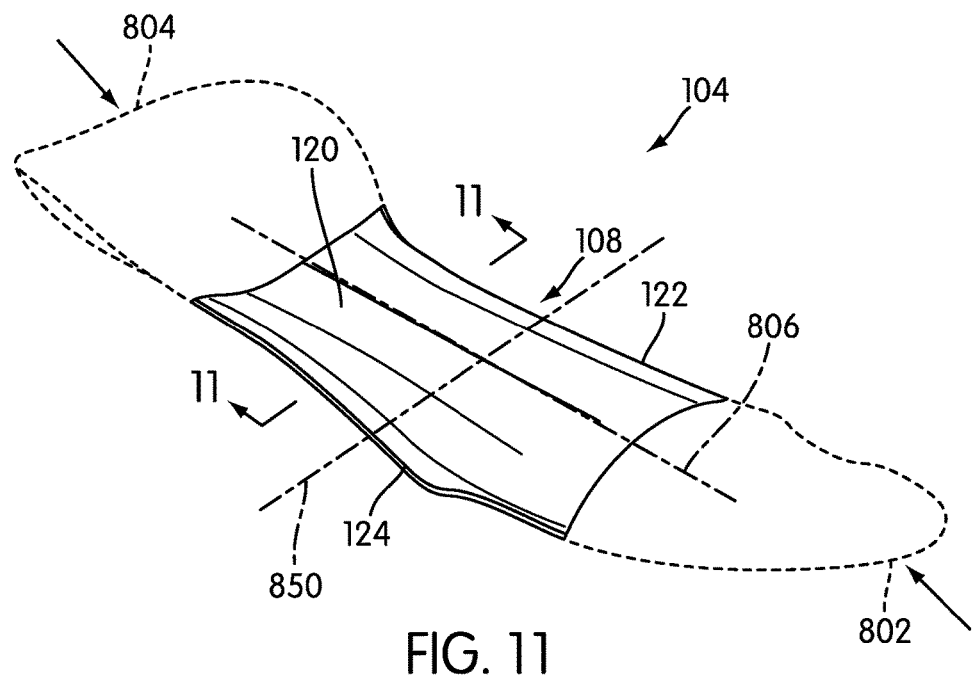
FIG. 11 is an isometric view of a preferred embodiment of an arch region of a full length composite plate.

Referring to FIG. 11, a preferred embodiment of arch region 108 may include medial portion 122 and lateral portion 124. Arch region 108 may also include central portion 120. Preferably, arch region 108 includes provisions to supply stiffness to the arch as well as provisions to minimize or eliminate buckling of full length composite plate 104. In some situations, compressive loads may be applied to full length composite plate 104 at forward region 802 and rear region 804, as seen in FIG. 10. These compressive loads may cause compression of full length composite plate 104 along central axis 806. If the compressive loads are strong enough, full length composite plate 104 may buckle.

Figure 12:
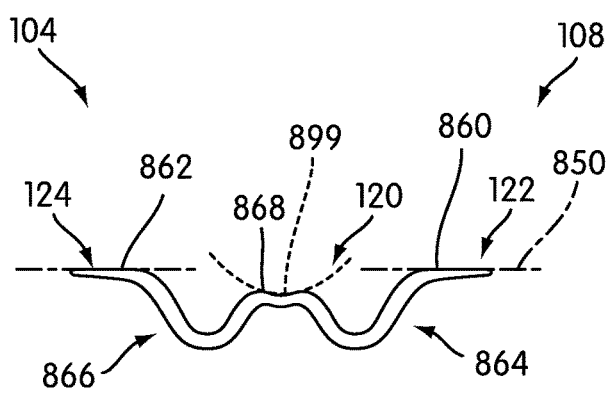
FIG. 12 is a cross sectional view of a preferred embodiment of an arch region of a full length composite plate.

Referring to FIG. 12, the geometry of full length composite plate 104 along arch region 108 is best seen in a cross sectional view. Preferably, medial portion 124 includes first flat portion 860. Likewise, lateral portion 122 preferably includes second flat portion 862. Central portion 120 preferably includes first angled portion 864 and second angled portion 866. Central portion 120 may also include rounded portion 868. Preferably, first flat portion 860 and second flat portion 862 are both generally coincident with surface 850. Rounded portion 868 preferably follows contour 899 of arch region 108 along the length of the article of footwear. In some embodiments, contour 899 may be the shape of the last of article of footwear 100. First angled portion 864 and second angled portion 866 are preferably not parallel to surface 850. In a preferred embodiment, first angled portion 864 and second angled portion 866 are both rounded.

In a preferred embodiment, first angled portion 864 and second angled portion 866 are configured to supply stiffness to arch region 108. In some embodiments, second angled portion 866 may be slightly larger in order to increase stability by slowing the rate of pronation along medial side 124. Furthermore, first flat portion 850 and second flat portion 862 are preferably configured to minimize or eliminate buckling when flexed.

Figure 13:
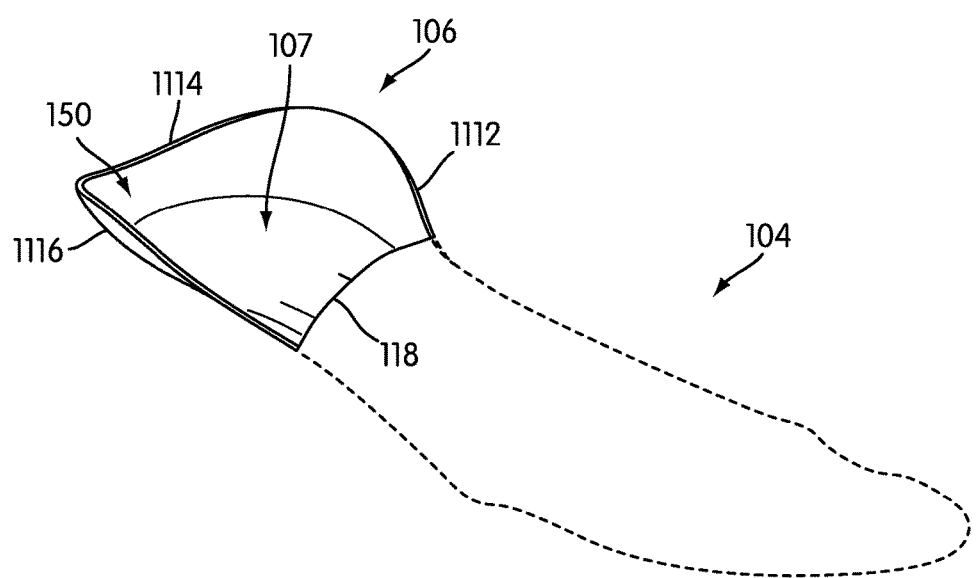
FIG. 13 is an isometric view of a preferred embodiment of a heel cup.

In a preferred embodiment, full length composite plate 104 includes provisions for increasing heel stability as well as for improving traction. Referring to FIG. 13, a preferred embodiment of heel region 106 of full length composite plate 104 may include heel cup 107. Here, the arch region and the forefoot region are shown in phantom. Heel cup 107 includes heel outer periphery 150 and central portion 118. In a preferred embodiment, heel outer periphery 150 is disposed at an angle to central portion 118. Heel outer periphery 150 includes medial portion 1112, lateral portion 1116, and rear portion 1114.

As heel cup 107 is associated with the heel of the foot, the various portions of the heel cup are intended to provide support for the heel. In particular, central portion 118 is disposed under the heel during use. Likewise, medial portion 1112 may be disposed against the medial side of the heel during use. Lateral portion 1116 may be disposed against the medial side of the heel during use. Rear portion 1114 may be disposed against the rear of the heel during use.

During use of the article of footwear, there may be a tendency for the heel to move outside of the heel region of the outsole. Medial portion 1112, lateral portion 1116, and rear portion 1114 each act to keep the heel confined to the heel region of the outsole.

In some embodiments, heel cup 107 may be used simultaneously with a minimal heel counter. This minimal heel counter may be either internal or external. In some embodiments, heel cup 107 may be used instead of a heel counter.

Although in this embodiment, tread elements are directly attached to full length composite plate 104, other embodiments may include tread elements that have been over-molded on a full length composite plate, as part of an outsole assembly. The over-molded material may include tread elements, as well as other structural elements for the outsole assembly. Embedding the full length composite plate in the molded material may be accomplished by using an over-molding technique.

Figure 14:
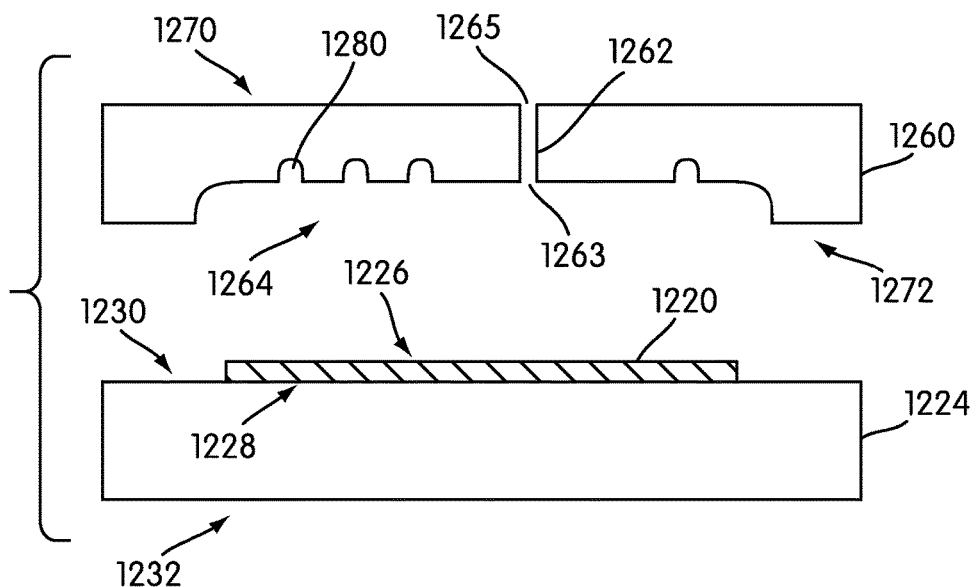
FIG. 14 is a schematic view of a preferred embodiment of a first step of a method for making an outsole assembly.

In FIG. 14, a schematic diagram of a preferred embodiment of a first step of a method for making an outsole assembly is shown. The method of making an outsole assembly includes a full length composite plate 1220, a molding base 1224, and a mold 1260. Molding base 1224 provides support for full length composite plate 1220 during the over-molding process. Mold 1260 is used to create the over-mold to be attached directly to full length composite plate 1220, which may include tread elements as well as other structural features. In some embodiments, full length composite plate 1220 can also create support and shutoff in regions where over-molding is not desired.

Full length composite plate 1220 includes a first side 1226 and a second side 1228. Molding base 1224 includes a first side 1230 and a second side 1232. Mold 1260 includes a first side 1270 and a second side 1272. Mold 1260 also includes molding channel 1262 and central cavity 1264. Central cavity 1264 is manufactured to yield the desired molded portion for full length composite plate 1220, once a molding material has been added. Molding channel 1262 provides a means for filling central cavity 1264 with a molding material. Molding channel 1262 is preferably in fluid communication with central cavity 1264 through first orifice 1263. Second orifice 1265 is preferably disposed along first mold side 1270.

Although in this embodiment only one molding channel is shown, other embodiments may include multiple molding channels. These molding channels may be used in a similar way to that of molding channel 1262, providing a means for filling central cavity 1264 with a molding material.

Central cavity 1264, when filled with a molding material, yields the molded portion of an outsole assembly. In some embodiments, central cavity 1264 includes at least one secondary cavity 1280. This secondary cavity is disposed along the periphery of central cavity 1264. The secondary cavity may be shaped like a tread element in some embodiments. Multiple secondary cavities may also be included in central cavity 1264. Thus, by using central cavity 1264 and secondary cavities, the molded portion of the outsole assembly may include traction elements and other general structure for the molded portion of the outsole assembly.

During the first step in the method of making an outsole assembly, second side 1228 of full length composite plate 1220 is associated with first side 1230 of molding base 1224. Full length composite plate 1220 is preferably fixed to molding base 1224 via clamp pressure and part geometry reflected in the mold cavity and core.

Figure 15:
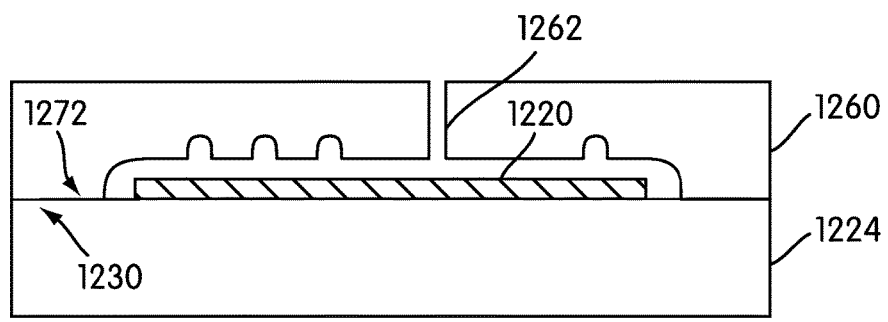
FIG. 15 is a schematic view of a preferred embodiment of a second step of a method for making an outsole assembly.

FIG. 15 is a schematic diagram of a preferred embodiment of a second step of the method for making an outsole assembly. During this second step, second side 1272 of mold 1260 is associated with first side 1230 of molding base 1224. This step may be accomplished by lowering mold 1260 onto molding base 1224, forming central cavity 1264. Referring to FIG. 14, the perimeter of central cavity 1264 along second side 1272 is preferably larger than the perimeter of both first side 1226 and second side 1228 of full length composite plate 1220.

Figure 16:
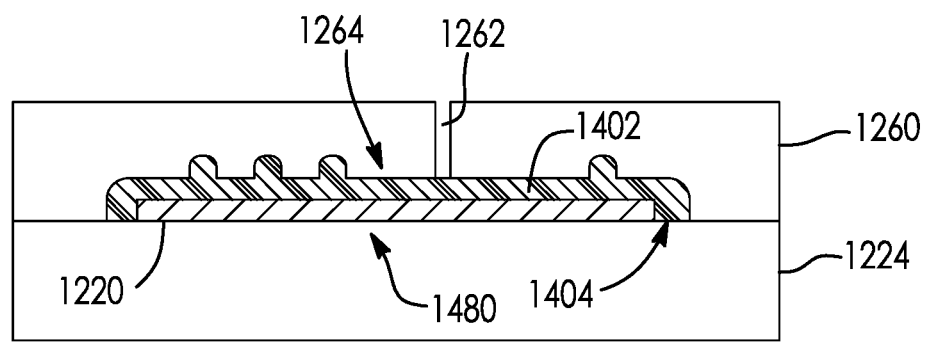
FIG. 16 is a schematic view of a preferred embodiment of a third step of a method for making an outsole assembly.

FIG. 16 is a schematic diagram of a preferred embodiment of a third step of the method for making an outsole assembly. During this third step, a molding material 1402, which is preferably in liquid or viscous form during this step, is injected into central cavity 1264 via mold channel 1262. Molding material 1402 preferably fills the entire cavity. During this third step, full length composite plate 1220 is embedded in molding material 1402. In particular, the first side 1404 of molding material 1402 is disposed against first side 1230 of molding base 1224. First side 1404 of molding material 1402 is disposed flush with second side 1228 of full length composite plate 1220. In some areas, for example, the lateral and/or medial edges of the arch region 1480, molding material 1402 may sandwich full length composite plate 1220.

Figure 17:
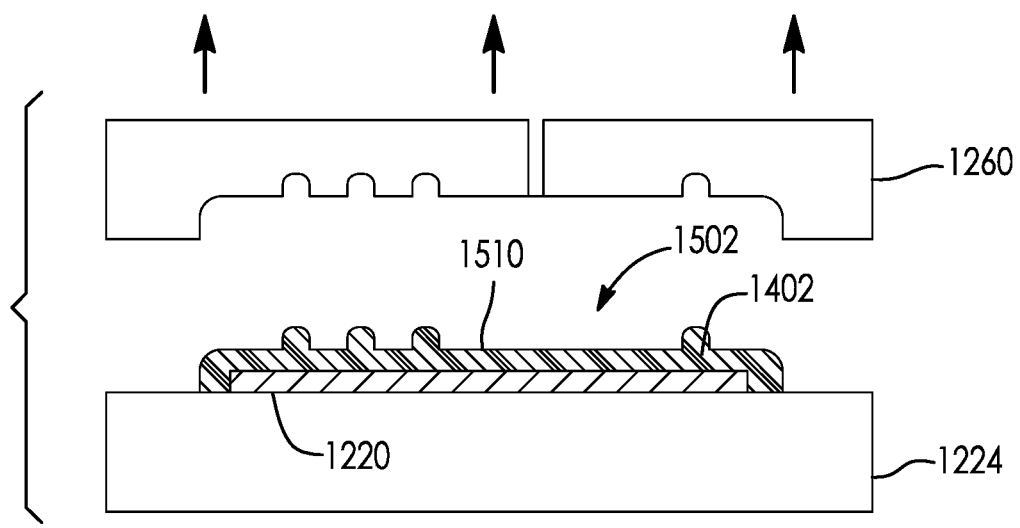
FIG. 17 is a schematic view of a preferred embodiment of an outsole assembly.

FIG. 17 is a schematic diagram of a preferred embodiment of a fourth and final step of the method for making an outsole assembly. During this fourth step, mold 1260 is removed from molding base 1224, after molding material 1402 has solidified. This step may be accomplished by raising mold 1260 with respect to molding base 1224. What remains is outsole assembly 1502, which includes full length composite plate 1220 and molding 1510. Outsole assembly 1502 may also be removed from molding base 1224 during this step.

In some cases, full length composite plate 1220 may be sandwiched by molding 1510. In some embodiments, the entire full length composite plate 1220 is sandwiched by molding 1510. In some embodiments, only portions of full length composite plate 1220 may be sandwiched by molding 1510.

Figure 18:
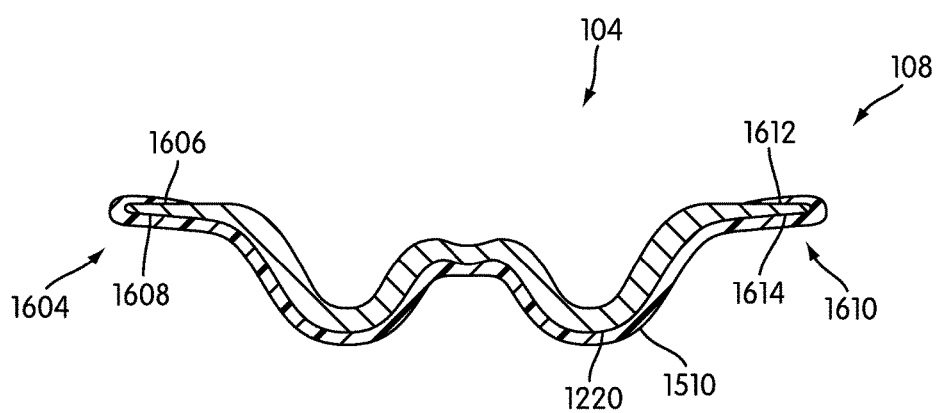
FIG. 18 is a cross sectional view of a preferred embodiment of an edge of a full length composite plate.

In particular, first edge 1604 of full length composite plate 1220 is preferably covered by molding 1510. As seen in FIG. 18, upper surface 1606 of first edge 1604 and lower surface 1608 of first edge 1604 are preferably both in contact with molding 1510. This arrangement provides a sandwiched structure where molding 1510 encases first edge 1604.

In a similar manner, second edge 1610 of full length composite plate 1220 is also preferably covered by molding 1510. As shown in FIG. 18, upper surface 1612 and lower surface 1614 of second edge 1610 are preferably both in contact with molding 1510. This arrangement provides a sandwiched structure where molding 1510 encases second edge 1610.

This arrangement allows first edge 1604 and second edge 1610 of full length composite plate 1220 to be better protected. It may also increase the area of contact between molding 1510 and full length composite plate 1220. Generally, the transition between molding material 1510 and full length composite plate 1220 is smooth along first edge 1604 and second edge 1610. In some embodiments, tread elements may extend from molding 1510, projecting in a direction opposite of full length composite plate 1220.

FIGS. 14-17 are schematic illustrations of the process by which an over-molding is applied to full length composite plate 1220. In a preferred embodiment, mold 1260 and molding base 1224 would also preferably include provisions for receiving and molding around all the physical features previously discussed as part of a preferred embodiment of full length composite plate 1220. For example, in a preferred embodiment, mold 1260 and molding base 1224 would each be configured with portions configured to be disposed adjacent to a first angled portion and a second angled portion of full length composite plate 1220. That is, the first side 1230 (see FIG. 15) of molding base 1224 need not be flat, but may include curves corresponding to unique features of a full length composite plate. In a similar manner, second side 1272 of mold 1230 may include curves corresponding to unique features of a full length composite plate.

In a preferred embodiment, a full length composite plate may be designed to provide maximum flexibility along the forefoot. In the human foot there is a natural bend line that occurs at a diagonal across the forward region of the foot. In order to provide maximum flexibility, it is desired that components of an article of footwear are designed to bend elastically in this region.

Figure 19:
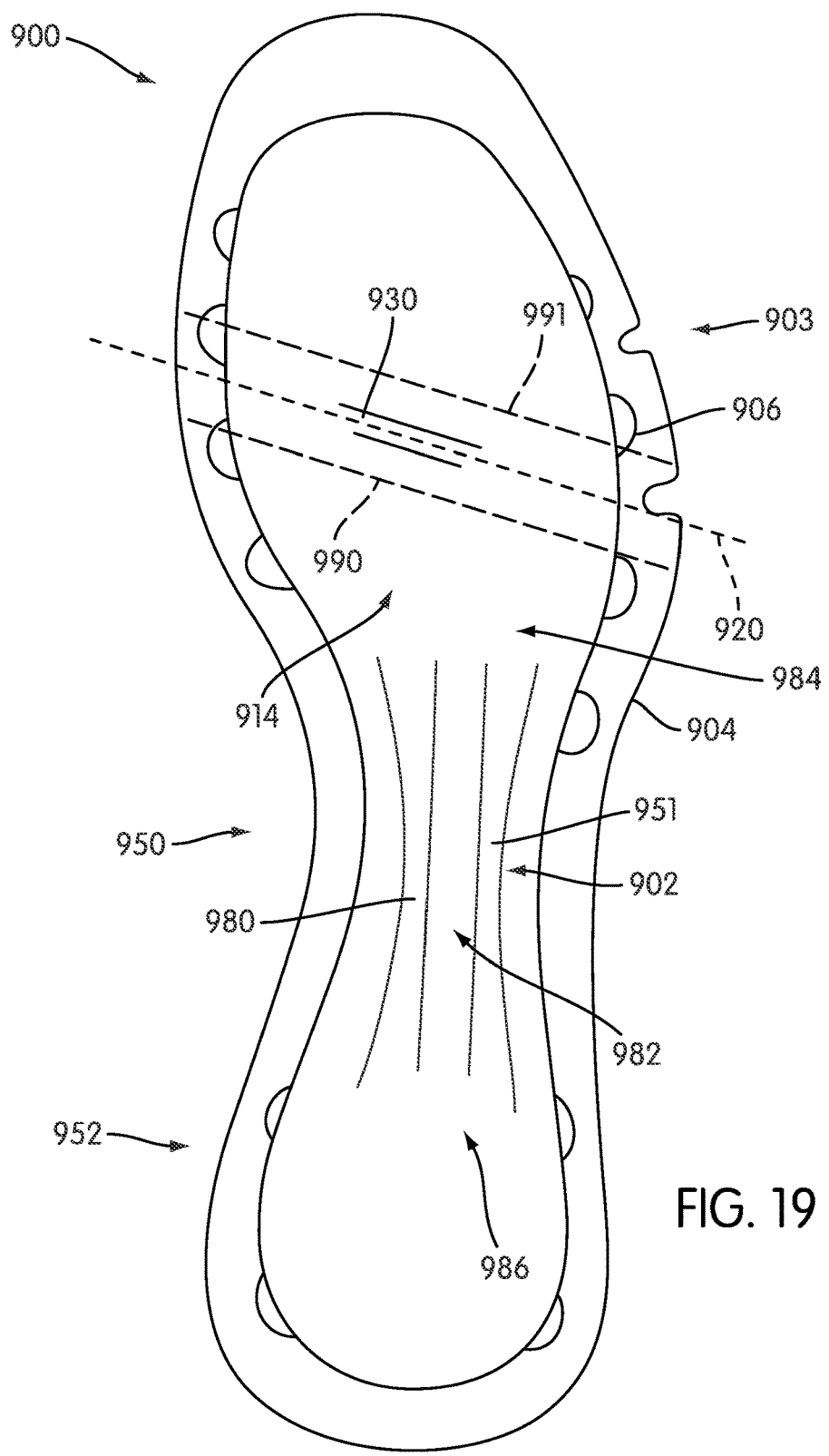
FIG. 19 is a plan view of an alternative embodiment of an outsole assembly with a bending region.

FIG. 19 shows an alternative embodiment of outsole assembly 900 that includes full length composite plate 902 and molding 904. Outsole assembly 900 includes forefoot region 903, arch region 950, and heel region 952.

Preferably, outsole assembly 900 includes provisions that facilitate bending along forefoot region 903. In FIG. 19, 920 represents the natural bend line of the foot. Bending region 991 is a region proximate to natural bend line 920. Some embodiments include provisions to increase the flexibility of bending region 991. In some embodiments, molding slot 930 is provided to allow increased flexibility in bending region 991.

In some embodiments, flexibility is increased in bending region 991 of molding 904 by reducing the thickness of molding 904 along molding slot 930. Additionally, forefoot region 903 is relatively flat when compared with arch region 950 and heel region 952. These features allow forefoot region 903 to have increased flexibility in comparison to arch region 950 and heel region 952. In particular, a bending region 990 of forefoot region 903 has increased flexibility over arch region 950 and heel region 952. In some embodiments, bending region 990 may be a region other than forefoot region 903. In some embodiments, bending region 990 may be an arch region or a heel region.

Additionally, full length composite plate 902 may include first angled portion 980 and second angled portion 982. First angled portion 980 and second angled portion 982 are preferably wider at first end 984 and second end 986 of arch region 950. In a preferred embodiment, first angled portion 980 and second angled portion 982 are more narrow along middle portion 951 of arch region 950. As previously discussed, first angled portion 980 and second angled portion 982 add support to arch region 950.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of making an article of footwear comprising:
positioning a full length composite plate between a molding base and a mold, the composite plate including a first side in opposed contact with a support surface of the molding base, a second side disposed on an opposite side of the composite plate than the first side and opposing a mold surface of the mold, and a continuous and arcuate perimeter edge bounding an uninterrupted surface extending continuously from a heel end of the composite plate to a forefoot end of the composite plate and from a lateral side to a medial side of the article of footwear;
moving at least one of the mold and the molding base toward the other of the mold and the molding base to enclose the composite plate within a cavity of the mold;
filling the cavity with a liquid or viscous substance to cover the second side of the composite plate; and
solidifying the liquid or viscous substance to form a molding attached to the second side of the composite plate.

2. The method according to claim 1, wherein the cavity contains at least one secondary cavity disposed along, and in fluid communication with, an outer periphery of the cavity.

3. The method according to claim 2, further comprising filling the at least one secondary cavity with the liquid or viscous substance to form a traction element.

4. The method according to claim 1, further comprising holding the mold against the molding base under enough pressure to keep the liquid or viscous substance confined to a region bounded by the cavity and a portion of the molding base exposed to the cavity.

5. The method according to claim 1, wherein a cavity rim defining an outer periphery of the cavity and disposed along the mold surface of the mold has a perimeter larger than a perimeter of the composite plate.

6. The method according to claim 1, further comprising filling the cavity with the liquid or viscous substance through one or more injection channels of the mold.

7. The method according to claim 1, wherein the mold surface of the mold contacts the support surface of the molding base at a location spaced apart from a perimeter edge of the composite plate, wherein a portion of the support surface of the molding base is exposed to the cavity between the perimeter edge of the composite plate and a cavity rim defining an outer periphery of the cavity.

8. The method according to claim 7, wherein the portion of the support surface of the molding base that is exposed to the cavity is in contact with the liquid or viscous substance such that the liquid or viscous substance is disposed flush with the first side of the composite plate.

9. The method according to claim 7, wherein filling the cavity with the liquid or viscous substance comprises encasing at least one edge of the composite plate with the liquid or viscous substance.

10. The method according to claim 9, wherein the at least one edge comprises at least one of a lateral edge and a medial edge of an arch region of the composite plate.

11. The method according to claim 1, wherein positioning the full length composite plate between the molding base and the mold includes mating non-flat features of the composite plate with corresponding non-flat features of the support surface of the molding base.

12. The method according to claim 1, wherein an angled portion of the mold is disposed adjacent to a corresponding angled portion of the second side of the composite plate when the composite plate is enclosed within the cavity.

13. The method according to claim 1, further comprising forming a molding slot in the molding at a bending region of the article of footwear, wherein a thickness of the molding is reduced along the molding slot.

14. The method according to claim 1, wherein the full length composite plate comprises a first plurality of layers alternating with a second plurality of layers;
  wherein each layer of the first plurality of layers comprises a full length non-woven sheet;
  wherein each layer of the second plurality of layers comprises a full length woven fiber sheet;
  wherein each layer of the first plurality of layers has a first thickness;
  wherein each layer of the second plurality of layers has a second thickness;
  wherein the full length composite plate further comprises a first tie layer disposed on a first side of the alternating first and second pluralities of layers and a second tie layer disposed on a second side of the alternating first and second pluralities of layers opposite to the first side;
  wherein the first tie layer and the second tie layer each have a third thickness;
  wherein the third thickness is greater than the first thickness and the second thickness;
  wherein the full length composite plate, as measured as a single component comprising the first plurality of layers, the second plurality of layers, the first tie layer, and the second tie layer, has a percent elongation greater than 2 percent and a thickness less than or equal to approximately 2 mm;
  wherein the first tie layer provides the first side of the full length composite plate; and
  wherein the second tie layer provides the second side of the full length composite plate.

15. A method of making an article of footwear comprising:
  positioning a full length composite plate between a molding base and a mold, the composite plate including a first side in opposed contact with a support surface of the molding base, a second side disposed on an opposite side of the composite plate than the first side and opposing a mold surface of the mold, an arcuate lateral edge extending continuously along a lateral side of the footwear from a forefoot region to a heel region, and an arcuate medial edge extending continuously along a medial side of the footwear from the forefoot region to the heel region and cooperating with the lateral edge to bound an uninterrupted surface extending continuously from a heel end of the composite plate to a forefoot end of the composite plate and between the lateral edge and the medial edge;
  moving at least one of the mold and the molding base toward the other of the mold and the molding base to enclose the composite plate within a cavity of the mold;
  filling the cavity with a liquid or viscous substance to cover the second side of the composite plate; and
  solidifying the liquid or viscous substance to form a molding attached to the second side of the composite plate.

16. The method according claim 15, wherein injecting the liquid or viscous substance into the cavity includes applying the liquid or viscous substance to at least one of the medial edge and the lateral edge of the full length composite plate.

17. The method according to claim 16, wherein injecting the liquid or viscous substance into the cavity includes applying the liquid or viscous substance around an entire perimeter of the full length composite plate.

18. The method according to claim 15, wherein the mold surface of the mold contacts the support surface of the molding base at a location spaced apart from a perimeter of the full length composite plate, wherein a portion of the support surface of the molding base is exposed to the cavity between the perimeter of the full length composite plate and a cavity rim defining an outer periphery of the cavity, wherein the portion of the support surface of the molding base that is exposed to the cavity is in contact with the liquid or viscous substance such that the liquid or viscous substance is disposed flush with the first side of the full length composite plate.

19. The method according to claim 15, wherein the full length composite plate comprises a first plurality of layers alternating with a second plurality of layers;
  wherein each layer of the first plurality of layers comprises a full length non-woven sheet;
  wherein each layer of the second plurality of layers comprises a full length woven fiber sheet;
  wherein each layer of the first plurality of layers has a first thickness;
  wherein each layer of the second plurality of layers has a second thickness;
  wherein the full length composite plate further comprises a first tie layer disposed on a first side of the alternating first and second pluralities of layers and a second tie layer disposed on a second side of the alternating first and second pluralities of layers opposite to the first side;
  wherein the first tie layer and the second tie layer each have a third thickness;
  wherein the third thickness is greater than the first thickness and the second thickness;
  wherein the full length composite plate, as measured as a single component comprising the first plurality of layers, the second plurality of layers, the first tie layer, and the second tie layer, has a percent elongation greater than 2 percent and a thickness less than or equal to approximately 2 mm;
  wherein the first tie layer provides the first side of the full length composite plate;
  wherein the second tie layer provides the second side of the full length composite plate; and
  wherein the molding is attached to the second tie layer of the full length composite plate.

20. A method of making an article of footwear comprising:
  positioning a full length composite plate between a molding base and a mold, the composite plate including a first side in opposed contact with a support surface of the molding base, a second side disposed on an opposite side of the composite plate than the first side and opposing a mold surface of the mold, and an uninterrupted surface extending continuously from a heel end of the composite plate to a forefoot end of the composite plate and between and bounded by a continuous curved outer perimeter edge of the composite plate proximate an outer perimeter of the footwear;

moving at least one of the mold and the molding base toward the other of the mold and the molding base to enclose the composite plate within a cavity of the mold;

filling the cavity with a liquid or viscous substance to cover the second side of the composite plate; and solidifying the liquid or viscous substance to form a molding attached to the second side of the composite plate.

21. A method of making an article of footwear comprising:

associating a full length composite plate with a first side of a molding base, a first surface of the full length composite plate confronting the first side of the molding base, the full length composite plate also including a second surface disposed opposite to the first surface;

associating a first side of a mold with the first side of the molding base, enclosing the full length composite plate within a central cavity disposed within the mold;

filling the central cavity with a liquid or viscous substance through at least one injection channel in the mold;

wherein the liquid or viscous substance fills substantially an entirety of the central cavity and contacts the second surface of the full length composite plate;

wherein the full length composite plate comprises a first plurality of layers alternating with a second plurality of layers;

wherein each layer of the first plurality of layers comprises a full length non-woven sheet;

wherein each layer of the second plurality of layers comprises a full length woven fiber sheet;

wherein each layer of the first plurality of layers has a first thickness;

wherein each layer of the second plurality of layers has a second thickness;

wherein the full length composite plate further comprises a first tie layer disposed on a first side of the alternating first and second pluralities of layers and a second tie layer disposed on a second side of the alternating first and second pluralities of layers opposite to the first side;

wherein the first tie layer and the second tie layer each have a third thickness;

wherein the third thickness is greater than the first thickness and the second thickness;

wherein the full length composite plate, as measured as a single component comprising the first plurality of layers, the second plurality of layers, the first tie layer, and the second tie layer, has a percent elongation greater than 2 percent and a thickness less than or equal to approximately 2 mm;

wherein the first tie layer provides the first surface of the full length composite plate;

wherein the second tie layer provides the second surface of the full length composite plate;

wherein the method further comprises forming a molding from the liquid or viscous substance in the central cavity; and wherein the liquid or viscous substance solidifies to form a molding that is attached to the first tie layer of the full length composite plate.

22. A method of making an article of footwear comprising:

placing a full length composite plate between a mold and a molding base, wherein the full length composite plate has a first side facing the mold and a second side opposite to the first side and facing the molding base;

positioning the full length composite plate within a central cavity defined by the mold and the molding base;

injecting molding material into the central cavity through at least one injection channel in the mold;

filling the central cavity with the molding material and contacting the first side of the full length composite plate with the molding material;

wherein the molding material solidifies to form a molding attached to the first side of the full length composite plate;

wherein the full length composite plate comprises a first plurality of layers alternating with a second plurality of layers;

wherein each layer of the first plurality of layers comprises a full length non-woven sheet;

wherein each layer of the second plurality of layers comprises a full length woven fiber sheet;

wherein each layer of the first plurality of layers has a first thickness; wherein each layer of the second plurality of layers has a second thickness;

wherein the full length composite plate further comprises a first tie layer disposed on a first side of the alternating first and second pluralities of layers and a second tie layer disposed on a second side of the alternating first and second pluralities of layers opposite to the first side;

wherein the first tie layer and the second tie layer each have a third thickness;

wherein the third thickness is greater than the first thickness and the second thickness;

wherein the full length composite plate, as measured as a single component comprising the first plurality of layers, the second plurality of layers, the first tie layer, and the second tie layer, has a percent elongation greater than 2 percent and a thickness less than or equal to approximately 2 mm;

wherein the first tie layer provides the first side of the full length composite plate;

wherein the second tie layer provides the second side of the full length composite plate; and wherein the molding is attached to the second tie layer of the full length composite plate.

* * * * *